Figure 1:
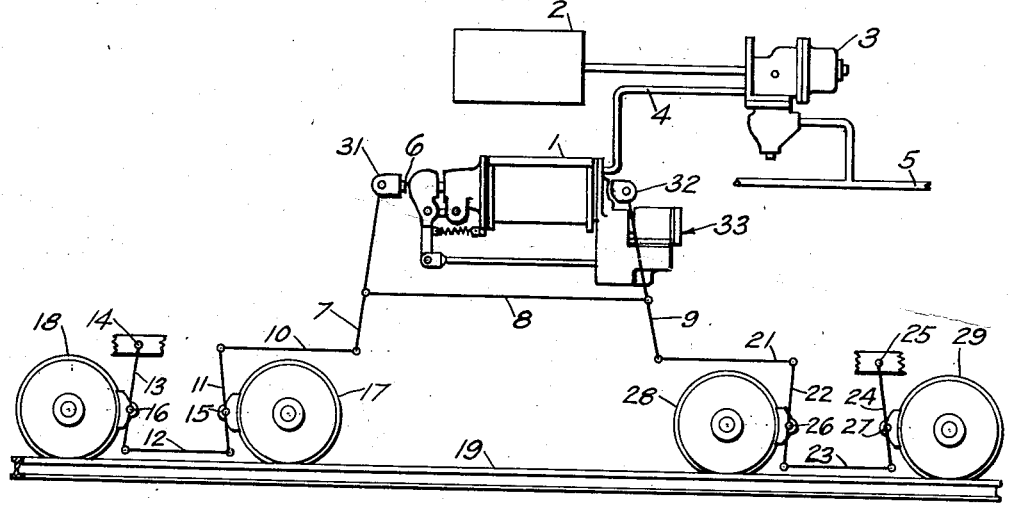

Oct. 11, 1933.  B. S. AIKMAN  2,132,913

BRAKE CONTROL MEANS

Filed July 6, 1935

INVENTOR
BURTON S. AIKMAN
BY Wm. M. Cady
ATTORNEY

Patented Oct. 11, 1938

2,132,913

UNITED STATES PATENT OFFICE 2,132,913

BRAKE CONTROL MEANS

Burton S. Aikman, Wilkinsburg, Pa., assignor to The Westinghouse Air Brake Company, Wilmerding, Pa., a corporation of Pennsylvania Application July 6, 1935, Serial No. 30,121

28 Claims. (Cl. 303—1)

My invention relates to brake control means for vehicles and more particularly to means for controlling braking equipment to prevent the wheels from sliding.

My invention has application to fluid pressure brake equipment employed on railway trains and traction vehicles and is effective to intermittently counteract the effect of high brake cylinder pressure during a brake application, at sufficiently frequent intervals, to prevent a high braking force from being maintained for a length of time at any one time that is sufficient to cause actual wheel sliding as the vehicle speed reduces, and to simultaneously cause a gradual reduction in high brake cylinder pressure to a predetermined low value.

It is well known that for a given braking pressure, friction type brakes are less effective in retarding the motion of a vehicle at high speed than at low speed because the coefficient of friction between the rubbing parts is lower at high speed than at low speed. When a full service or emergency brake application is made at high speed the brake cylinder pressure developed will exceed the pressure required to slide the wheels on the rails as the speed of the vehicle decreases. In order to bring a vehicle to a stop quickly, it has been the usual practice for an operator to apply the brakes with a high degree of braking pressure at high speed, and, as the speed of the vehicle decreases, to so operate the brakes as to cause the braking pressure to decrease in such manner that the vehicle is brought to a stop quickly and smoothly, without sliding of the wheels.

When railway trains and traction vehicles are operated at very high speeds, a correspondingly high braking force must be employed to bring the train or vehicle to a stop in a reasonable length of time. When such braking force is applied the problem of properly reducing the braking force by manual operation as the vehicle slows down becomes a difficult one and there is considerable danger of the wheels sliding on the rails. It is therefore desirable to provide, as a part of the brake equipment on high speed trains and vehicles, means for automatically reducing the braking force sufficiently to permit the wheels to maintain rotation and prevent their sliding on the rails.

It is an object of my invention to provide a brake equipment having a braking force releasing characteristic to intermittently relieve the effect of high brake cylinder pressure sufficiently to prevent wheel sliding.

It is another object of my invention to provide a braking force releasing device which operates intermittently to progressively reduce brake cylinder pressure during a brake application.

It is a further object of my invention to provide a brake force releasing device for intermittent reduction of brake cylinder pressure, the frequency of operation of which is such that a high brake cylinder pressure will not be in force a sufficient length of time at any one time, as the vehicle speed decreases, to cause actual wheel sliding at the existing vehicle speed.

Figure 2:
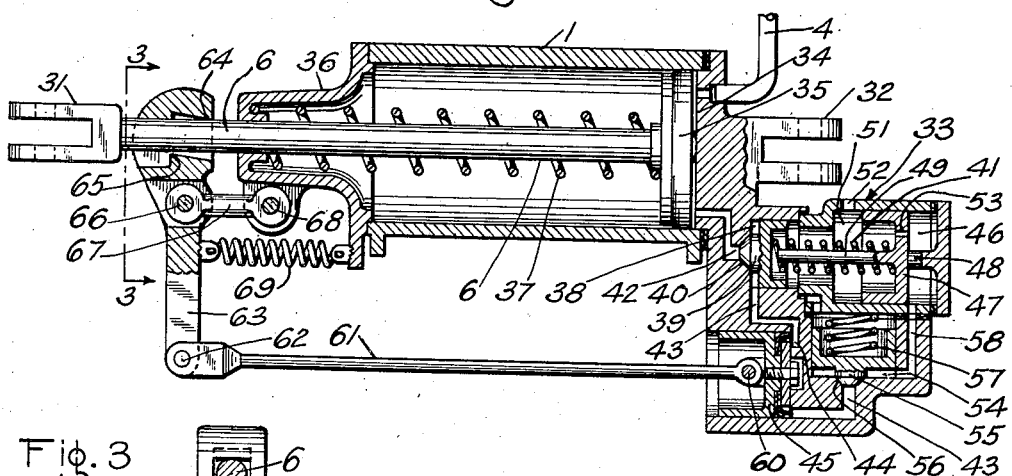
Figure 3:
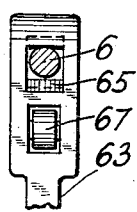

Other advantages and objects of my invention will appear from the following description of a specific embodiment thereof taken in connection with the accompanying drawing, in which Fig. 1 is a diagrammatic view of apparatus comprising a brake equipment arranged in accordance with one preferred embodiment of the invention, Fig. 2 is a view in vertical section through the brake cylinder and the braking force releasing mechanism, and Fig. 3 is a sectional view taken on line 3—3 of Fig. 2.

Referring to the drawing, a fluid pressure brake equipment is illustrated in Fig. 1 in which a brake cylinder 1 is provided and is supplied with fluid under pressure from an auxiliary reservoir 2 through a brake cylinder pipe 4 in accordance with the operation of a triple valve device 3 as controlled by the pressure in a brake pipe 5 in the usual way. A brake cylinder piston rod or stem 6 is operated in accordance with the supply of fluid under pressure to the brake cylinder 1 and is connected to the lever system including levers 7, 8 and 9, the lever 7 being connected to operate the levers 10, 11, 12 and 13, which are pivotally connected together for operating the brake shoes 15 and 16 against the wheels 17 and 18, respectively, that roll along the rail 19. The upper end of the lever 13 being pivotally connected to the car frame 14, the lever 9 of the brake equipment similarly controls the operation of the pivotally interconnected levers 21, 22, 23 and 24, for pressing the shoes 26 and 27 against the wheels 28 and 29, respectively. The upper end of the lever 24 is pivotally connected by the pin 25 to a point on the car frame. As illustrated, the upper end of the lever 7 is connected to the crosshead end 31 of the piston stem 6, and the upper end of the lever 9 is connected to a bifurcated portion 32 of the pressure head of the brake cylinder 1, so that movement of the crosshead 31 away from the pressure head, and of the interlinked lever system connected thereto, causes an equalized application of braking forces to the wheels 17, 18, 28 and 29.

The operating mechanism for the braking force release device 33 is connected to the pressure head of the brake cylinder 1, as best shown in Fig. 2, and operates from brake cylinder pressure to partially reduce the braking force below a value corresponding to brake cylinder pressure at intervals determined by the timing of the releasing device.

The brake cylinder 1 comprises a casing enclosing a piston chamber 34 containing a piston 35 that is connected to the piston stem or rod 6 which extends outwardly through the non-pressure head 36 of the brake cylinder 1, and which is surrounded by a release spring 37, one end of which engages the piston 35 and the other end of which engages the non-pressure head 36 to bias the piston 35 toward the right to a brake releasing position. The braking force release mechanism 33 comprises a casing enclosing a valve chamber 38 containing a spring-weighted valve piston 39 that is urged to its seat by a spring 41 to close communication from the piston chamber 34 through passages 42 and 43, to a piston chamber 44 containing a piston 45 that is provided with a stem or piston rod 61.

The braking force releasing mechanism also contains a piston chamber 46 containing a piston 47, illustrated as positioned against a stop 48, and provided with a stem 49 that extends centrally through the spring 41, the end acting as a stop for limiting the movement of the valve piston 39 away from its seat. A chamber 51 between the valve piston 39 and the piston 47 is connected to the atmosphere through an exhaust port 52 so that the pressure within the chamber 51 is continuously at atmospheric pressure. A restricted passage 53 through the piston 47 permits the gradual escape of fluid under pressure from the piston chamber 46 to the atmosphere.

A valve chamber 54 is provided, containing a spring-weighted valve piston 55 that is urged to its seat 56 by a spring 57, the lower end of which engages the valve 55 and the upper end of which engages the wall or partition forming the under side of the chamber 51. The valve piston 55 controls communication between the passage 43 and the piston chamber 44 through passage 58 to the piston chamber 46.

The piston 45 is attached by a pin 60 to a piston rod 61 that is pivoted by the pin 62 to a lever 63, the upper portion of which is provided with jaws 64 and 65 for gripping the piston rod 6 and moving it slightly to the right, against the pressure in the piston chamber 34, upon the movement of the piston 45 and the piston rod 61 toward the left. The lever 63 is pivotally supported upon a pin 66 carried by a link 67, the other end of which is pivotally supported by a pin 68 on the non-pressure head 36 of the brake cylinder. A spring 69 is provided, one end of which is connected to the lower end of the lever 63 and the other end of which is connected to the non-pressure head 36 for urging the lever 63 in a counterclockwise direction and forcing the piston rod 61 and the piston 45 toward the right to permit free movement of the piston rod 6 in accordance with changes in pressure in the piston chamber 34.

In order to understand the operation of applicant's invention, it should be borne in mind that the permissible braking forces exerted by the brake shoes upon the car wheels are normally limited by the average adhesion of the car wheels to the rails. If the brake shoe forces exceed this permissive value the adhesion of the car wheels to the rails is insufficient to prevent the wheels from sliding. Tests show, however, that a brief period of time exists between what is known as incipiency of wheel sliding and actual wheel sliding, that is, a brake shoe pressure sufficient to cause wheel sliding can be exerted for a short time without actually causing such sliding due to the time element involved.

As the brakes are applied and brake cylinder pressure increases within the piston chamber 34 to a predetermined value, the spring-weighted valve piston 39 will be forced from its seat 40 toward the right against the bias of the spring 41, thus permitting fluid under pressure to flow from the piston chamber 34 at piston chamber pressure, through passage 43, to the piston chamber 44 to force the piston 45 and piston rod 61 toward the left, and to rock the lever 63 in a clockwise direction to cause the jaws 64 and 65 at the upper end thereof to grip the piston rod 6, through which the brakes are applied, and exert force thereon opposing the force exerted by the pressure within the piston chamber 34, thus slightly decreasing the degree of application of the brakes below that corresponding to brake cylinder pressure. The degree of application of the brakes will be reduced both by reason of the force exerted through the lever 63, and because of the reduction in the pressure of the fluid in the brake cylinder chamber 34 as the result of the supply of fluid under pressure therefrom to the release mechanism 33. As the pressure builds up in the piston chamber 44 and in the passage 43 to brake cylinder pressure, the weighted valve piston 55 is, at a predetermined pressure, also forced upwardly from its seat 56 against the bias of the spring 57, thus permitting the flow of fluid under pressure at brake cylinder pressure from the passage 43 through passage 58 to the piston chamber 46 to move the piston 47 against the bias of the spring 41 until the piston stem 49 engages the valve piston 39 and forces it to its seat 40.

It will be noted that the area of the valve chamber 38, subject to piston chamber pressure after the valve piston 39 has been moved from its seat, is of considerably greater area than the central portion of the valve piston 39 that is subject to brake cylinder pressure when the valve piston 39 is seated. As the result of the differential force on the valve piston 39 tending to urge it against the bias of the spring 41 when the valve piston is seated and when it is unseated, a considerable drop in brake cylinder pressure below that pressure necessary to unseat the valve piston 39 is required before the valve piston will again seat, due to the pressure of the spring 41 thereon. It will also be noted that the area of the piston 47, that is subject to brake cylinder pressure after the valve piston 55 has become unseated, is greater than the area of the valve piston 39 that is subject to brake cylinder pressure in the valve chamber 38, so that, as soon as pressure builds up to a predetermined value in the piston chamber 46, the piston 47 acting through the stem 49 will force the valve piston 39 to its seat 40, and thereby cut off the supply of fluid under pressure from the brake cylinder chamber 34 to the chamber 38 of the release mechanism 33, and prevent a further reduction in the pressure of the fluid in the brake cylinder chamber 34. Fluid under pressure is released gradually from the piston chamber 46, and from the piston chamber 44 and the valve chamber 38, through the restricted passage 53 and port 52 to the atmosphere.

It will be noted that when the valve piston 55 is unseated, permitting fluid at brake cylinder pressure to flow to the piston chamber 46, the full area of the valve piston is exposed to brake cylinder pressure, so that, after the valve piston is opened, the valve piston will be held open until fluid pressure acting on the valve piston has been reduced to a considerable degree less than the degree of fluid pressure required to open the valve. The effect of the differential areas between the central portion of the valve piston 55, that is subject to the pressure within the passage 43, and the larger area of the valve piston, that is subject to the pressure within the valve chamber 54, is to require a considerable decrease in pressure within the passage 43 and valve chamber 54, after the valve piston has been unseated, below the value necessary to unseat it, before the valve piston will again seat. When, as a result of the release of fluid under pressure to the atmosphere through the restricted passage 53 in the piston 47, the pressure in the valve chamber 54 has been reduced sufficiently to permit the valve piston 55 to seat, the pressure in the piston chamber 44 will have permitted the piston 45 to be moved to its illustrated position by the spring 69, thus disengaging the jaws 64 and 65 from the piston rod 6 and permitting the brakes to be applied to a value corresponding to the pressure within the piston chamber 34 of the brake cylinder 1.

As the pressure within the piston chamber 46 decreases due to the release of fluid under pressure through the restricted passage 53, the force of the piston stem 49 against the valve piston 39 is reduced, and the piston 47 and stem 49 are moved by the force of the spring 41 against the stop 48, as illustrated, thus permitting the valve piston 39 to again be unseated due to the pressure within the piston chamber 34 as applied to the central smaller area of the valve piston 39 through passage 42, thus repeating the cycle of operation just above described, causing the piston 45 to be forced to the left to again exert force on the piston rod 6 tending to move it toward the right to decrease the brake shoe pressure somewhat below that corresponding to brake cylinder pressure within the piston chamber 34, while the pressure of the fluid in the brake cylinder chamber 34 is further reduced by the supply of fluid therefrom to the releasing mechanism 33. Likewise, as the pressure within the piston chamber 44 builds up to a value sufficient to exert substantial force on the piston 45, the pressure of fluid supplied from the brake cylinder through the passage 43 will build up to a value sufficient to force the valve piston 55 upwardly from its seat against the bias of the spring 57 and effect the supply of fluid under pressure to the piston chamber 46 to again cause the seating of the valve piston 39.

These cycles of operation are repeated until the pressure in the piston chamber 34 of the brake cylinder 1 has decreased to a value depending upon the setting of the spring 41 below which the fluid at brake cylinder pressure, supplied through the passage 42 to the seated area of valve piston 39, is insufficient to force the valve piston 39 from its seat 40.

It will be noted that immediately after the brake cylinder pressure has been increased to a predetermined degree to effect a corresponding application of the brakes, the lever 63 acting through the jaws 64 and 65 exerts force on the piston rod in a brake releasing direction to reduce the degree of application of the brakes an amount sufficient to prevent the wheels from sliding on the rails. At the same time the pressure of the fluid in the brake cylinder is reduced by the supply of fluid under pressure from the brake cylinder to the release mechanism 33, with the result that the degree of brake application which the brake cylinder can effect is correspondingly reduced. At a short time interval thereafter the lever 63 is permitted to move in a counterclockwise direction to release its grip upon the piston rod 6 and permit the reapplication of the brakes to the full value of brake cylinder pressure, which, as pointed out above, has been reduced somewhat by the release of fluid therefrom. The frequency of operation of the partial release of the brakes is such that high brake cylinder pressure will not continue for a sufficient length of time to effect actual wheel sliding but will be reduced at the incipient stage of wheel sliding. This means of relieving the brake shoe pressure will reduce in small increments the brake cylinder pressure and the brake shoe pressure resulting therefrom, so that, as the speed of the train is reduced, and the coefficient of friction between the brake shoes and the car wheels is increased, the brake cylinder pressure will be reduced at a rate to provide the maximum rate of deceleration of the vehicle until a low vehicle speed is reached, when the brake cylinder pressure will have been reduced to such value that the braking forces will produce a smooth stop.

While one preferred embodiment of my invention has been illustrated and described, it will be apparent to those skilled in the art that many modifications in the apparatus illustrated may be made within the spirit of my invention and I do not wish to be limited otherwise than by the scope of the appended claims.

Having now described my invention, what I claim as new and desire to secure by Letters Patent, is:

1. In a brake equipment for vehicles, a brake cylinder, means for supplying fluid under pressure to said brake cylinder to apply the brakes, and means subject to brake cylinder pressure and operative upon a predetermined brake cylinder pressure for effecting a partial release of the braking force occasioned by the brake cylinder pressure for a short interval of time, and for thereafter interrupting said brake releasing force to permit reapplication of the brakes to a value corresponding to brake cylinder pressure.

2. In a brake equipment for vehicles, a brake cylinder, means for supplying fluid under pressure to said brake cylinder to apply the brakes, and means subject to brake cylinder pressure and operative upon a predetermined brake cylinder pressure for effecting a partial release of the braking force occasioned by the brake cylinder pressure, and means for intermittently reducing said brake cylinder pressure in a step by step manner to prevent the wheels from sliding on the rails.

3. In a brake equipment for vehicles, a brake cylinder, means for supplying fluid under pressure to said brake cylinder to apply the brakes, means subject to brake cylinder pressure and operative upon a predetermined brake cylinder pressure for effecting a reduction in the braking force below that corresponding to brake cylinder pressure, means subject to the operation of said last mentioned means for effecting a predetermined reduction in brake cylinder pressure and for effecting a reapplication of the brakes in accordance with brake cylinder pressure.

4. In a brake equipment for vehicles, a brake cylinder, means for supplying fluid under pressure to said brake cylinder to apply the brakes, means for preventing the sliding of the wheels comprising means responsive to a predetermined brake cylinder pressure for effecting a reduction in the braking force below the value corresponding to brake cylinder pressure, a reduction in brake cylinder pressure, and a full application of the brakes in accordance with the reduced brake cylinder pressure.

5. In a brake equipment for vehicles, a brake cylinder, means for supplying fluid under pressure to said brake cylinder to apply the brakes, means subject to brake cylinder pressure and operative upon a predetermined brake cylinder pressure for effecting a recurring decrease in braking force below that corresponding to brake cylinder pressure, a reduction in brake cylinder pressure, and a reapplication of the brakes in accordance with brake cylinder pressure.

6. In a brake equipment for vehicles, a brake cylinder, means for supplying fluid under pressure to said brake cylinder to apply the brakes, means for preventing wheel slipping comprising means for intermittently effecting a reduction in brake cylinder pressure and for effecting an alternate reduction in the braking force below brake cylinder pressure and a reapplication of the brakes in accordance with the reduced brake cylinder pressure.

7. In a brake equipment for vehicles, a brake cylinder, means for supplying fluid under pressure to said brake cylinder to apply the brakes, a braking force reducing means subject to brake cylinder pressure and operative upon a brake cylinder pressure above a predetermined value for effecting a reduction in braking force below that corresponding to brake cylinder pressure, means responsive to the operation of said last named means for effecting a reduction in brake cylinder pressure and for interrupting the operation of said braking force reducing means to permit a reapplication of the braking force to a valve corresponding to the reduced brake cylinder pressure.

8. In a brake equipment for vehicles, a brake cylinder, means for supplying fluid under pressure to said brake cylinder to apply the brakes, a braking force reducing means subject to brake cylinder pressure and operative upon a brake cylinder pressure above a predetermined value for effecting a recurring cycle of operation to effect a reduction in braking force below that corresponding to brake cylinder pressure, a reduction in brake cylinder pressure, and the interruption of the operation of said braking force reducing means to permit a reapplication of the braking force to a value corresponding to the reduced brake cylinder pressure.

9. In a brake equipment for vehicles, a brake cylinder, means for supplying fluid under pressure to said brake cylinder to apply the brakes, means for reducing the sliding of the wheels on the rails comprising a pressure operated braking force reducing means for reducing the degree of application of the brakes below a value corresponding to the pressure on the brake cylinder piston, a weighted valve subject to brake cylinder pressure for effecting the supply of fluid under pressure to said pressure operated means, and means subject to the pressure in said pressure operated means for interrupting the operation of said braking force reducing means.

10. In a brake equipment for vehicles, a brake cylinder, means for supplying fluid under pressure to said brake cylinder to apply the brakes, means for reducing the sliding of the wheels on the rails comprising a pressure operated braking force reducing means for reducing the degree of application of the brakes below a value corresponding to the pressure on the brake cylinder piston, a weighted valve subject to brake cylinder pressure for effecting the supply of fluid under pressure from said brake cylinder to said pressure operated means, and means subject to the pressure in said pressure operated means for interrupting the flow of fluid under pressure from said brake cylinder and for gradually releasing fluid under pressure from said pressure operated braking force reducing means to effect a reapplication of the brakes in accordance with brake cylinder pressure.

11. In a brake equipment for vehicles, a brake cylinder, means for supplying fluid under pressure to said brake cylinder to apply the brakes, means for reducing the sliding of the wheels on the rails comprising a pressure operated braking force reducing means for reducing the degree of application of the brakes below a valve corresponding to the pressure on the brake cylinder piston, a weighted valve subject to brake cylinder pressure for effecting the supply of fluid under pressure from said brake cylinder to said pressure operated means upon an increase in brake cylinder pressure above a predetermined value, and means subject to the pressure in said pressure operated means for interrupting the operation of said braking force reducing means and for effecting a reduction in brake cylinder pressure upon the increase in pressure in said pressure operated means above a predetermined value.

12. In a brake equipment for vehicles, a brake cylinder, means for supplying fluid under pressure to said brake cylinder to apply the brakes, means for reducing the sliding of the wheels on the rails comprising a pressure operated braking force reducing means for reducing the degree of application of the brakes below a value corresponding to the pressure on the brake cylinder piston, a weighted valve subject to brake cylinder pressure for effecting the supply of fluid under pressure from said brake cylinder to said pressure operated means, a weighted valve subject to the pressure in said pressure operated means for effecting the movement of said first named weighted valve to close communication to said pressure operated means, and means for reducing the pressure in said pressure operated means to permit a reapplication of the brakes in correspondence with brake cylinder pressure.

13. In a brake equipment for vehicles, a brake cylinder, means for supplying fluid under pressure to said brake cylinder to apply the brakes, a braking force reducing means subject to brake cylinder pressure and operative upon a brake cylinder pressure above a predetermined value for effecting a reduction in braking force below that corresponding to brake cylinder pressure comprising a pressure operated means for opposing the effect of said brake cylinder pressure, valve means for effecting the supply of fluid under pressure thereto in accordance with brake cylinder pressure, and means for effecting a partial release of fluid under pressure therefrom to interrupt the operation of said braking force reducing means.

14. In a brake equipment for vehicles, a brake cylinder, means for supplying fluid under pressure to said brake cylinder to apply the brakes, a braking force reducing means subject to brake cylinder pressure and operative upon a brake cylinder pressure above a predetermined value for effecting a reduction in braking force below that corresponding to brake cylinder pressure and comprising pressure operated means for opposing the effect of said brake cylinder pressure, valve means for effecting the supply of fluid under pressure thereto in accordance with the brake cylinder pressure, and means for effecting a partial release of fluid under pressure from said brake cylinder and from said pressure operated means to effect a reapplication of the brakes in accordance with the reduced brake cylinder pressure.

15. In a brake equipment for vehicles, a brake cylinder, means for supplying fluid under pressure to said brake cylinder to apply the brakes, a braking force reducing means for reducing the braking force below the value corresponding to brake cylinder pressure and having a braking force reducing pressure chamber, means responsive to brake cylinder pressure above a predetermined value for effecting the supply of fluid under pressure to said chamber at brake cylinder pressure, pressure operated means for interrupting the supply of fluid under pressure to said braking force reducing pressure chamber, means responsive to the pressure in said pressure chamber above a predetermined value for supplying fluid under pressure to said pressure operated means, and means for releasing fluid under pressure from said braking force reducing pressure chamber and from said pressure operated means to effect the release of said braking force reducing means to permit the reapplication of a braking force in accordance with brake cylinder pressure, and the release of said pressure operated means to permit further operation of the means responsive to brake cylinder pressure for effecting a subsequent operation of said braking force reducing means.

16. In a brake equipment for vehicles, a brake cylinder, means for supplying fluid under pressure to said brake cylinder to apply the brakes, a braking force reducing means for reducing the braking force below the value corresponding to brake cylinder pressure having a brake reducing pressure and chamber, means responsive to brake cylinder pressure above a predetermined value for effecting the supply of fluid under pressure from said brake cylinder to said chamber, pressure operated means for interrupting the supply of fluid under pressure to said brake reducing chamber, means responsive to the pressure in said pressure chamber above a predetermined value for supplying fluid under pressure from said pressure chamber to said pressure operated means, and means for releasing fluid under pressure from said brake reducing pressure chamber and from said pressure operated means to effect a release of said braking force reducing means to permit a reapplication of the braking force in correspondence with brake cylinder pressure, and a release of said pressure operated means to permit further operation of said means responsive to brake cylinder pressure for effecting a subsequent operation of said braking force reducing means.

17. In a brake equipment for vehicles, a brake cylinder, means for supplying fluid under pressure to said brake cylinder to apply the brakes, a braking force reducing means for reducing the braking force below the value corresponding to brake cylinder pressure, having a brake reducing pressure chamber and a weighted valve responsive to brake cylinder pressure above a predetermined value for effecting the supply of fluid under pressure from said brake cylinder to said chamber, a pressure operated means having a stem for urging said weighted valve to its seat, and means responsive to the pressure in said pressure chamber above a predetermined value for supplying fluid under pressure from said pressure chamber to said pressure operated means to effect a release of said braking force reducing means.

18. In a fluid pressure brake, in combination, a brake cylinder, a brake cylinder piston therein, means for supplying fluid under pressure to said brake cylinder, a piston, means for operatively connecting said piston to the brake cylinder piston to oppose the pressure on the brake cylinder piston by the fluid pressure acting on said opposing piston, and means operated upon a predetermined increase in brake cylinder pressure for supplying fluid under pressure to said opposing piston.

19. In a fluid pressure brake, in combination, a brake cylinder, a brake cylinder piston therein, means for supplying fluid under pressure to said brake cylinder, a piston, means for operatively connecting said piston to the brake cylinder piston to oppose the pressure on the brake cylinder piston by the fluid pressure acting on said opposing piston, valve means operated upon a predetermined increase in brake cylinder pressure for supplying fluid under pressure to said opposing piston, and means operated upon a predetermined increase in the pressure of fluid supplied to said opposing piston for operating said valve means to cut off the supply of fluid to said opposing piston.

20. In a fluid pressure brake, in combination, a brake cylinder, means for supplying fluid under pressure to the brake cylinder, mechanism operated upon a predetermined increase in brake cylinder pressure for reducing the braking force effected by the increase in brake cylinder pressure, and means operative after a predetermined time interval for cutting said mechanism out of action.

21. In a fluid pressure brake, in combination, a brake cylinder, means for supplying fluid under pressure to the brake cylinder, mechanism operated upon a predetermined increase in brake cylinder pressure for interposing a force to oppose the braking force set up by the increase in brake cylinder pressure, and means operated after a predetermined time interval for relieving said opposing force.

22. In a fluid pressure brake, in combination, a brake cylinder, a piston in said brake cylinder and operable on an increase in the pressure of the fluid therein to exert force to effect an application of the brakes, an opposing piston operative on an increase in the pressure of the fluid supplied thereto to exert force opposing the force exerted by said brake cylinder piston, and means subject to and operated on a predetermined increase in the pressure of the fluid supplied to the brake cylinder to supply fluid from the brake cylinder to said opposing piston to reduce the braking force below the value corresponding to the brake cylinder pressure and to also reduce brake cylinder pressure.

23. In a fluid pressure brake, in combination, a brake cylinder, a piston in said brake cylinder and operable on an increase in the pressure of the fluid therein to exert force to effect an application of the brakes, an opposing piston operative on an increase in the pressure of the fluid supplied thereto to exert force opposing the force exerted by said brake cylinder piston, means subject to and operated on a predetermined increase in the pressure of the fluid supplied to the brake cylinder to supply fluid from the brake cylinder to said opposing piston to reduce the braking force below the value corresponding to the brake cylinder pressure and to also reduce brake cylinder pressure, and means subject to and operated on a predetermined increase in the pressure of the fluid supplied to the opposing piston for cutting off the supply of fluid to said piston and for releasing fluid therefrom.

24. In a vehicle fluid pressure brake equipment, in combination, braking means, application means operative on an increase in the pressure of the fluid in a pressure chamber to exert force to effect an application of said braking means, means for supplying fluid under pressure to said pressure chamber and to thereafter cut off the supply of fluid under pressure thereto, releasing means operative on an increase in the pressure of the fluid in a control chamber to exert force opposing said application means, and valve means for supplying fluid under pressure from said pressure chamber to said control chamber, whereby the degree of application of said braking means is reduced by the reduction in the pressure of the fluid in said pressure chamber and by operation of said releasing means, said valve means being thereafter operative to cut off the supply of fluid under pressure from said pressure chamber to said control chamber and to release fluid from said control chamber to effect a reapplication of the braking means by said application means to a degree determined by the pressure of the fluid remaining in the pressure chamber.

25. In a fluid pressure brake equipment for a vehicle having a wheel, in combination, a brake cylinder, a piston mounted in said brake cylinder and having an application chamber at the face thereof, said piston being operable on an increase in the pressure of the fluid in said application chamber to exert braking force varying in accordance with the increase in the pressure of the fluid in said application chamber, means for supplying fluid under pressure to said application chamber and to thereafter cut off the supply of fluid under pressure to said application chamber, releasing means operative on an increase in the pressure of the fluid in a pressure chamber to exert force opposing that of the brake cylinder piston, means for releasing fluid under pressure from said application chamber and to thereafter cut off the release of fluid from said chamber to maintain the pressure therein at a lower value than that initially present therein to thereby reduce the braking force created by said brake cylinder piston, means for supplying fluid under pressure to said pressure chamber concurrently with the release of fluid from said application chamber to thereby cause the effective braking force created by said brake cylinder piston to be reduced below the value corresponding to application chamber pressure, and means for thereafter releasing fluid under pressure from said pressure chamber to permit a reapplication of the brakes in accordance with the reduced application chamber pressure.

26. In a fluid pressure brake equipment for a vehicle having a wheel, in combination, a brake cylinder, a piston mounted in said brake cylinder and having an application chamber at the face thereof, said piston being operable on an increase in the pressure of the fluid in said application chamber to exert braking force on said wheel to resist rotation thereof, the degree of braking force varying in accordance with the increase in the pressure of the fluid in said application chamber, means for supplying fluid under pressure to said application chamber to increase the pressure therein to a value which may be sufficient to produce braking force on said wheel to a degree to prevent rotation thereof and to thereafter cut off the supply of fluid under pressure to said application chamber, releasing means operative on an increase in the pressure of the fluid in a pressure chamber to exert force opposing that of the brake cylinder piston, means for supplying fluid under pressure from said application chamber to said pressure chamber to thereby reduce the pressure of the fluid in the application chamber and reduce the braking force created by said brake cylinder piston and to also cause the releasing means to create a force opposing that of the brake cylinder piston and thereby cause the effective braking force produced by said brake cylinder piston to be reduced below the value corresponding to application chamber pressure, and means for thereafter releasing fluid under pressure from said pressure chamber to permit a reapplication of the brakes in accordance with the reduced application chamber pressure.

27. Vehicle brake apparatus comprising a brake cylinder, brake control means operative to control the supply of fluid under pressure to and the release of fluid under pressure from the brake cylinder to effect application and release respectively of the brakes, means providing a chamber, means effective while said brake control means is conditioned to cause application of the brakes for causing fluid under pressure to be supplied from the brake cylinder to said chamber to reduce brake cylinder pressure and consequently the degree of application of the brakes, and means responsive to the pressure in said chamber for exerting a force in opposition to brake cylinder pressure to further reduce the effective degree of application of the brakes.

28. Vehicle brake apparatus comprising a brake cylinder, brake control means operative to control the supply of fluid under pressure to and the release of fluid under pressure from the brake cylinder to effect application and release respectively of the brakes, means providing a chamber, means automatically effective while the brake control means is conditioned to cause application of the brakes for causing fluid under pressure to be supplied from the brake cylinder to said chamber to reduce the brake cylinder pressure and consequently the degree of application of the brakes, and means responsive to the pressure in said chamber for exerting a force in opposition to brake cylinder pressure to further reduce the effective degree of application of the brakes.

BURTON S. AIKMAN.